(12) United States Patent
Schenk et al.

(10) Patent No.: US 8,234,792 B2
(45) Date of Patent: Aug. 7, 2012

(54) LINEAR ENCODER

(75) Inventors: Oliver Schenk, Palling (DE); Andreas Reith, Bogen (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 18 days.

(21) Appl. No.: 12/924,446

(22) Filed: Sep. 28, 2010

(65) Prior Publication Data

US 2011/0072676 A1   Mar. 31, 2011

(30) Foreign Application Priority Data

Sep. 29, 2009   (DE) .......................... 10 2009 043 293

(51) Int. Cl.
*G01B 7/14*   (2006.01)
*G01B 11/14*   (2006.01)
(52) U.S. Cl. .......................................................... 33/706
(58) Field of Classification Search ................... 33/707, 33/706
See application file for complete search history.

(56) References Cited

U.S. PATENT DOCUMENTS

| | | | | |
|---|---|---|---|---|
| 3,708,681 A * | 1/1973 | Ivers | ........................ | 250/231.16 |
| 3,816,002 A * | 6/1974 | Wieg | ............................ | 356/395 |
| 4,586,260 A * | 5/1986 | Baxter et al. | .................... | 33/706 |
| 5,526,706 A * | 6/1996 | Nelle | ............................ | 73/865.8 |
| 5,832,616 A * | 11/1998 | Fiedler | ............................ | 33/706 |
| 5,856,668 A | 1/1999 | Nelle et al. | | |
| 6,564,468 B2 * | 5/2003 | Blattner et al. | ................. | 33/706 |
| 7,596,880 B2 * | 10/2009 | Martin et al. | ................... | 33/707 |

FOREIGN PATENT DOCUMENTS

DE   197 46 532 A1   4/1999

* cited by examiner

*Primary Examiner* — Christopher Fulton
(74) *Attorney, Agent, or Firm* — Brinks, Hofer, Gilson & Lione

(57) ABSTRACT

A linear encoder that includes a housing having: an elongated hollow profile section including a first face end and a second face end; a cap disposed on the first face end; and a seal which is disposed in sealing fashion between the hollow profile section and the cap, wherein the seal includes an electrically conductive connecting element. The linear encoder further includes a scale made of electrically nonconductive material, wherein the scale is disposed inside the housing and the scale includes a measuring graduation that is scannable by a scanning unit, which is movable in a measurement direction relative to the housing. The linear encoder includes a shunt made of electrically conductive material, wherein the shunt is mounted on the scale and extends in the measurement direction and wherein the electrically conductive connecting element is configured so as to establish an electrical connection between the shunt and at least one of the hollow profile section and the cap.

19 Claims, 3 Drawing Sheets

LINEAR ENCODER

RELATED APPLICATIONS

Applicants claim, under 35 U.S.C. §119, the benefit of priority of the filing date of Sep. 29, 2009 of a German patent application, copy attached, Serial Number 10 2009 043 293.0, filed on the aforementioned date, the entire contents of which is incorporated herein by reference.

BACKGROUND

1. Technical Field

The present invention relates to a linear encoder.

2. Background Information

An example of a linear encoder is described in German Patent Disclosure DE 197 46 532 A1. This linear encoder serves to measure lengths as well as travel distances and the linear encoder is used particularly in machining tools for measuring the relative motion of a tool with respect to a workpiece to be machined. The linear encoder can be used in coordinate measuring machines and increasingly in the semiconductor industry as well.

This known linear encoder includes a housing which protects the scale against environmental factors. For that purpose, the housing has an elongated tubular profile section whose face ends are each closed off with a cap. A resilient sheet-metal tongue is screwed onto at least one of these caps. The tongue contacts the scale resiliently and thus establishes an electrical connection between the measuring graduation of the scale and the cap.

This sheet-metal tongue is a problematic part, which is relatively complicated to produce and assemble.

OBJECTS AND SUMMARY OF THE INVENTION

It is therefore an object of the present invention to disclose a linear encoder which is secure against interference, is constructed simply, and is easy to assemble.

This object is attained according to the present invention by a linear encoder that includes a housing having: an elongated hollow profile section including a first face end and a second face end; a cap disposed on the first face end; and a seal which is disposed in sealing fashion between the hollow profile section and the cap, wherein the seal includes an electrically conductive connecting element. The linear encoder further includes a scale made of electrically nonconductive material, wherein the scale is disposed inside the housing and the scale includes a measuring graduation that is scannable by a scanning unit, which is movable in a measurement direction relative to the housing. The linear encoder includes a shunt made of electrically conductive material, wherein the shunt is mounted on the scale and extends in the measurement direction and wherein the electrically conductive connecting element is configured so as to establish an electrical connection between the shunt and at least one of the hollow profile section and the cap.

According to one aspect of the present invention, the linear encoder has a housing, which includes housing parts, such as an elongated hollow profile section and at least one cap disposed on the face end thereof. A scale has a measuring graduation that can be scanned for position measurement by a scanning unit that is movable in the measurement direction relative to the housing. The scale is disposed in the interior of a hollow profile section. On a surface of the scale and extending along the scale, a shunt is provided, which diverts electrical charges that accumulate on the surface of the scale. An electrically conductive connecting element establishes an electrical contact between the shunt of the scale and at least one of the housing parts, that is, either the hollow profile section or the cap or both. The electrically conductive connecting element is a component of a seal which is inserted in sealing fashion between the hollow profile section and the cap. The electrical shunt embodied according to the present invention is implemented on at least one face end of the hollow profile section. Advantageously, however, it is embodied on both face ends.

It is especially advantageous if the electrically conductive connecting element includes an electrically conductive elastomer. It is also advantageous if the electrically conductive connecting element is integrally formed in one piece onto the seal. As a result, the seal and the electrically conductive connecting element can be made from the elastomer in the same production process by injection molding.

Preferably, the seal is embodied in a plate-like fashion and rests on a face end of the hollow profile section by forcing the cap onto the face end. This plate-like seal has at least one protrusion, which forms the electrically conductive connecting element and resiliently contacts the scale.

The measuring graduation is designed in particular for photoelectric scanning and includes markings, spaced apart from one another in the measurement direction, of electrically conductive material that are electrically conductively connected to one another via an electrically conductive layer of the scale. This electrically conductive layer extends as far as the face ends of the hollow profile section and forms the shunt, wherein the shunt is electrically connected to the electrically conductive connecting element.

By the present invention, the resilient property of the material of the seal is advantageously utilized for resilient contacting of the shunt of the scale. Because the material of the seal is also embodied as electrically conductive, both good electrical contacting of the shunt and an electrical connection with at least one of the housing parts, that is, the hollow profile section or the cap or both, is ensured. At least this housing part is embodied to be contacted electrically with a reference potential. The housing part therefore preferably includes electrically conductive material, so that on being mounted on a machine it comes into electrical contact with the machine and is thus connected to the reference potential solely by this mounting—for instance by being screwed on.

Further details and advantages of the present invention will be explained by the following description of an exemplary embodiment in connection by the attached drawing figures.

DETAILED DESCRIPTION OF THE PREFERRED EMBODIMENTS

Figure 1:
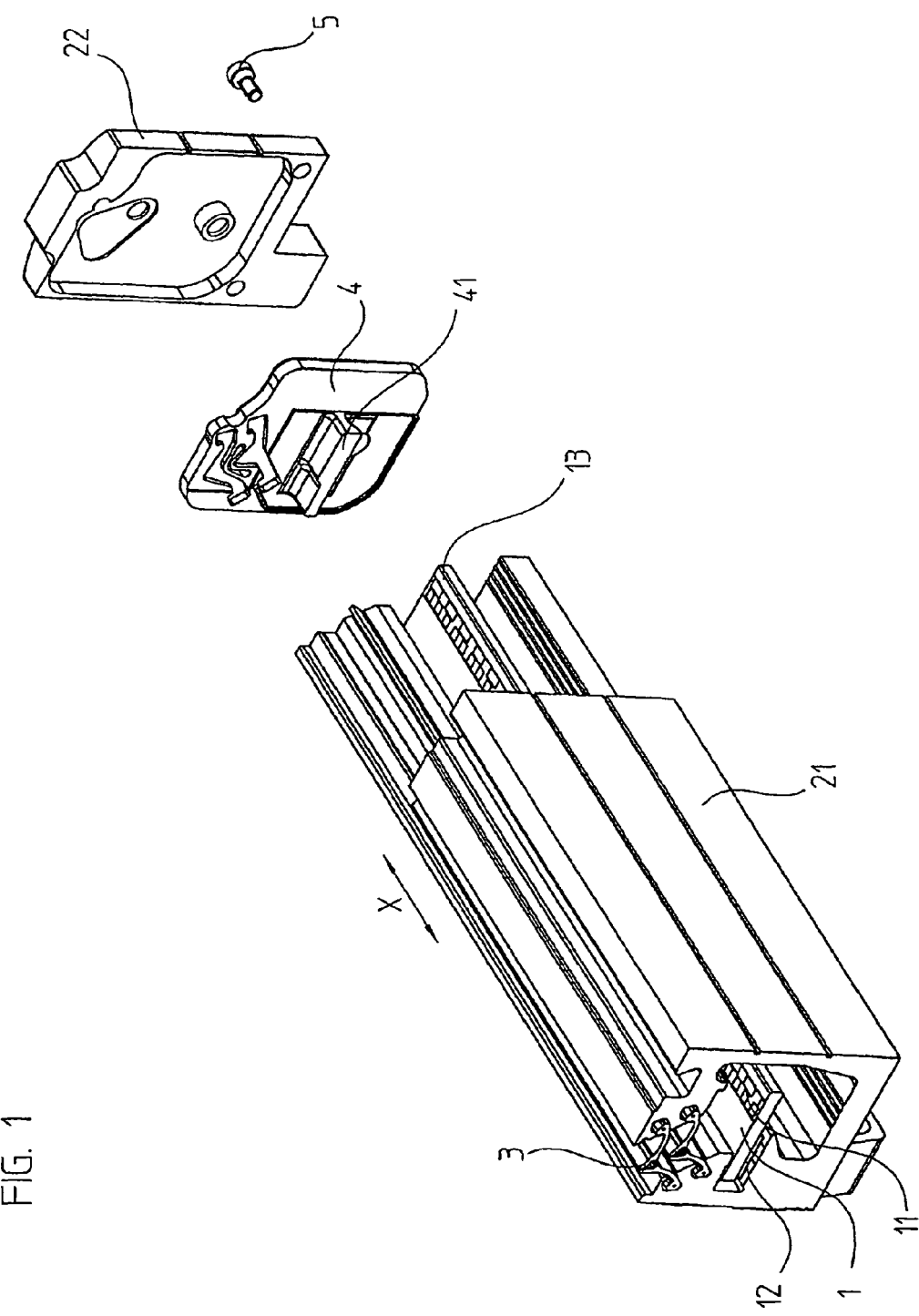
FIG. 1 shows an exploded perspective view of an embodiment of a linear encoder before it is assembled in accordance with the present invention.

The present invention will be described in further detail in terms of a photoelectric linear encoder. This linear encoder includes a scale 1 and a scanning unit (not shown), which are movable in a measurement direction X relative to one another.

During a position measurement process, the scanning unit scans a measuring graduation 11 of the scale 1 and forms position measurement values from such scanning Since the present invention does not relate to the scanning unit, the scanning unit is not shown in the drawings for the sake of simplicity.

For photoelectric scanning of the measuring graduation 11, the scale 1 is made of a transparent material and includes opaque markings 111, 112 (FIG. 3), in the form of a coating. The scale 1 moreover includes electrically insulating material, in particular glass or glass ceramic, over which the measuring graduation 11 is applied.

The scale 1 is accommodated in protected fashion in a housing. For that purpose, the housing includes a housing part, such as an elongated hollow profile section 21. Extending in the measurement direction X, the hollow profile section 21 has sealing lips 3, through which an attachment on which the scanning unit is secured, reaches in a known manner. The two face ends of the hollow profile section 21 are each closed off with respective other housing parts, such as caps 22. A plate-like seal 4 is inserted between the hollow profile section 21 and each cap 22.

The scale 1 is disposed inside the hollow profile section 21 and is secured to it by an elastic adhesive layer 12. As a result, upon temperature changes, the scale 1 can expand freely, largely independently of the hollow profile section 21.

As a result of various factors, such as external electrical fields or the guidance of the scanning unit on the scale 1 by rollers or guide shoes, the surface of the scale 1 can become electrically charged, creating a potential difference with respect to other electrically conductive parts of the linear encoder, and in particular with respect to the scanning unit that is guided with only a slight spacing from the scale 1. This potential difference can lead to a pulselike discharge. Such a discharge is superimposed on the electrical scanning signals, which can lead to measurement errors.

Figure 3:
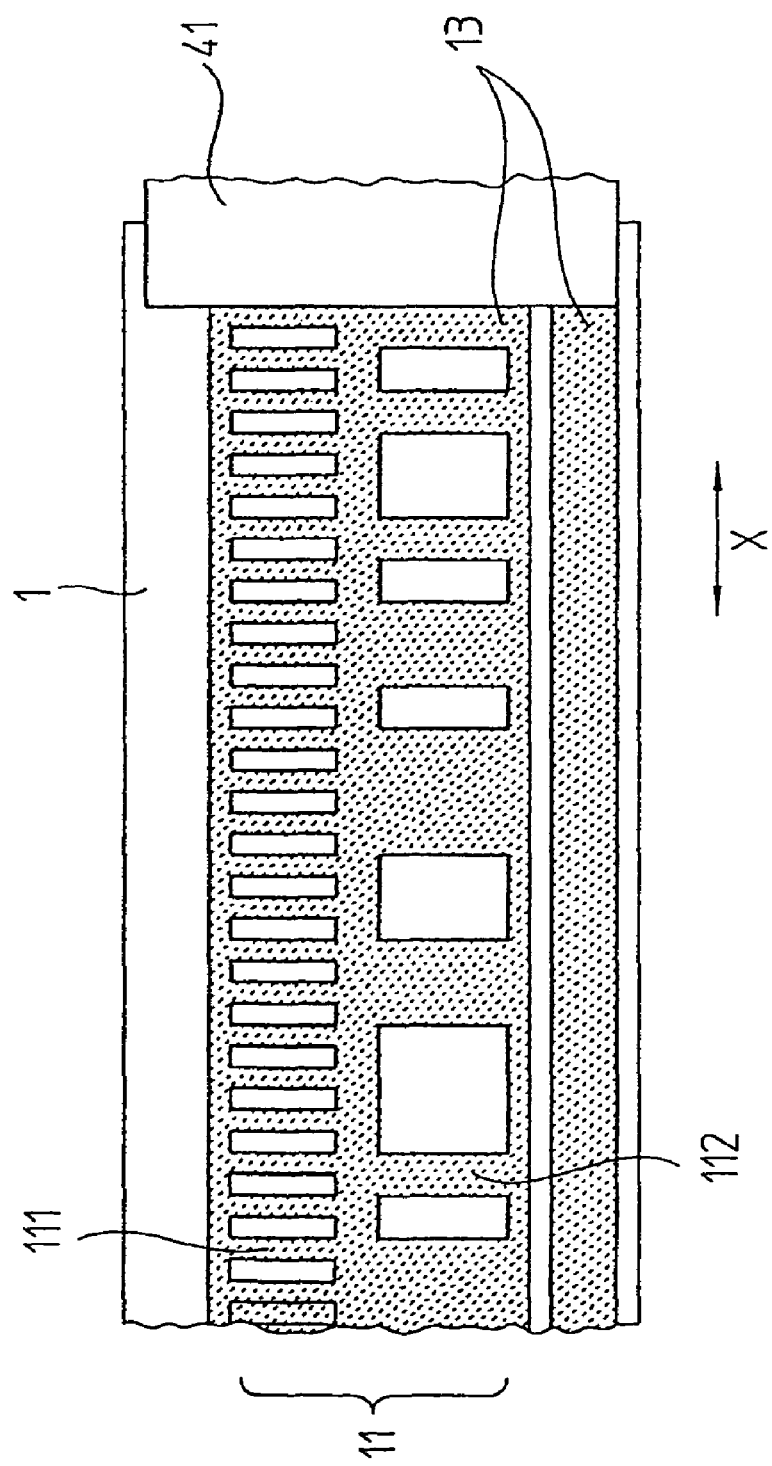
FIG. 3 is a plan view of an embodiment of a scale to be used with the linear encoder of FIGS. 1-2 in accordance with the present invention.

To dissipate these electrical charges from the surface of the scale 1 over the entire length of the scale 1 as much as possible, a shunt 13 is preferably applied to the surface of the scale 1. The shunt 13 extends over the length of the scale 1. The shunt 13 is preferably a continuous layer of electrically conductive material, uninterrupted in the measurement direction X, on the surface of the scale 1. The measuring graduation 11 and the layer forming the shunt 13 are applied to the surface of the scale 1 in the same layering process. If the measuring graduation 11 is embodied in the form of an electrically conductive layer, this layer electrically connects the individual markings 111, 112 of the measuring graduation 11 to one another and reaches at least to one of the two face ends of the scale 1. Alternatively or in addition—as shown in FIG. 3—a shunt 13 that is separate from and spaced apart from the measuring graduation 11 can be provided, in the form of a strip of electrically conductive material extending alongside the measuring graduation 11 in the measurement direction X.

Alternatively, the shunt 13 can be a metal strip rolled onto the surface of the scale 1 or in some other way put into intimate contact with the scale surface.

In a manner not shown, instead of the metal strip previously mentioned, an electrically transparent layer can form the shunt 13. That has the advantage that this transparent layer does not optically interfere with the markings 111, 112 of the measuring graduation 11 and can thus be applied over a large surface area, including underneath or above these markings 111, 112—in particular by sputtering.

An electrically conductive connecting element 41 now contacts the shunt 13, that is, the electrically conductive material. Such contact establishes an electrical connection with the housing, that is, the housing part which is the hollow profile section 21 and/or the cap 22. This housing part, the hollow profile section 21 and/or cap 22, is electrically conductive and in particular includes an electrically conductive metal, such as aluminum or steel. Since in the measurement mode, the housing and the scanning unit are as a rule attached onto electrically conductive machine elements of a machine, they are connected to the same reference potential as the scanning unit, so that no potential differences can occur.

Figure 2:
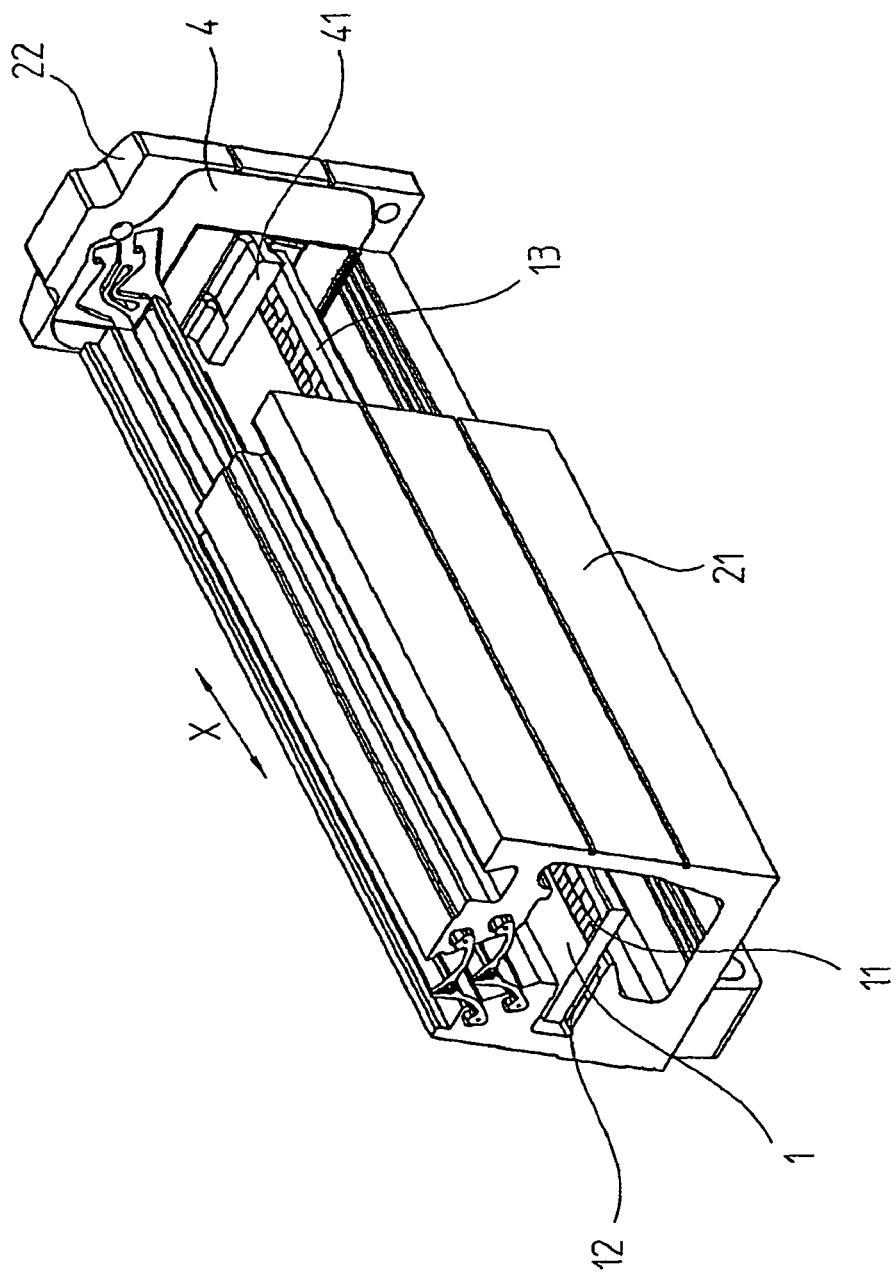
FIG. 2 is a perspective view of the linear encoder of FIG. 1 in an assembled state.

The electrically conductive connecting element 41 is a component of a seal 4, which is inserted in sealing fashion between the hollow profile section 21 and the cap 22. The seal 4 seals off the hollow profile section 21 at the end by being disposed between the face end of the hollow profile section 21 and the cap 22. The cap 22 is secured to the hollow profile section 21 by way of screws 5 and forces the seal 4 against the face end of the hollow profile section 21. For that purpose, the seal 4 is embodied in plate-like fashion, and a region of it rests on the face end of the hollow profile section 21. A further region of the seal 4 has a protrusion, which forms the connecting element 41 for resiliently contacting the shunt 13 of the scale 1. As can be seen particularly in FIG. 2, during assembly, the protrusion comes to rest on the shunt 13 embodied as an electrically conductive layer. As a result of the elastically resilient embodiment, a secure mechanical contact and thus also a secure electrical contact are assured.

The seal 4 and the connecting element 41 are preferably embodied as one piece. In particular, the seal 4 and the electrically conductive connecting element 41 are integrally formed together by injection molding, wherein an electrically conductive elastomer, such as NBR ("Nitrile butadiene rubber"), EPDM ("ethylene propylene diene Monomer (M-class) rubber"), or ACM ("alkyl acrylate copolymer"), is especially suitable for the common material of the seal 4 and the connecting element 41. The elastomer has excellent electrical conductivity, because of electrically conductive fillers, especially based on carbon.

In FIG. 3, an enlarged plan view of the scale 1 is shown. The measuring graduation 11 in this case includes one incremental track with a succession of equally spaced-apart markings 111, and one absolute track, disposed next to the incremental track, with further markings 112 that are disposed irregularly. The markings 111 and 112 include a layer of electrically conductive material, such as chromium, and are connected electrically to one another by the shunt 13 embodied as an electrically conductive layer. Alternatively or in addition, a layer in the form of a strip, as shown in FIG. 3, disposed alongside the measuring graduation 11 and spaced apart from it can serve as the shunt. The electrically conductive connecting element 41 contacts the shunt 13 and thus establishes an electrically conductive connection with the reference potential.

As FIG. 3 shows, with the connecting element 41 embodied according to the present invention, the electrical contacting of a relatively wide measuring graduation 11 is possible. The elastomer of the electrically conductive connecting element 41 optimally adapts to the scale 1 and compensates for tolerances so that secure contacting is ensured. The elastomer of the electrically conductive connecting element 41 furthermore has the property of maintaining the contact even if vibration occurs while averting abrasion of the shunt 13 embodied as a layer.

The foregoing description is provided to illustrate the present invention, and is not to be construed as a limitation. Numerous additions, substitutions and other changes can be made to the present invention without departing from its scope as set forth in the appended claims.

We claim:

1. A linear encoder comprising:
a housing comprising:
an elongated hollow profile section comprising a first face end and a second face end;
a cap disposed on said first face end; and
a seal which is disposed in sealing fashion between said hollow profile section and said cap, wherein said seal comprises an electrically conductive connecting element;
a scale made of electrically nonconductive material, wherein said scale is disposed inside said housing and said scale comprises a measuring graduation that is scannable by a scanning unit, which is movable in a measurement direction relative to said housing;
a shunt made of electrically conductive material, wherein said shunt is mounted on said scale and extends in said measurement direction; and
wherein said electrically conductive connecting element comprises an electrically conductive elastomer and said electrically conductive connecting element is configured so as to establish an electrical connection between said shunt and at least one of said hollow profile section and said cap.

2. The linear encoder as defined by claim 1, wherein said electrically conductive connecting element is integrally formed onto said seal, and wherein said electrically conductive connecting element and said seal together comprise an electrically conductive elastomer.

3. The linear encoder as defined by claim 2, wherein said seal is embodied in plate-like fashion and rests on a face end of the hollow profile section and furthermore has at least one protrusion, which forms said electrically conductive connecting element and resiliently contacts said shunt.

4. The linear encoder as defined by claim 2, wherein said shunt is an electrically conductive layer applied to said scale.

5. The linear encoder as defined by claim 1, wherein said seal is embodied in plate-like fashion and rests on a face end of the hollow profile section and furthermore has at least one protrusion, which forms said electrically conductive connecting element and resiliently contacts said shunt.

6. The linear encoder as defined by claim 1, wherein said shunt is an electrically conductive layer applied to said scale.

7. The linear encoder as defined by claim 1, wherein said measuring graduation comprises markings of electrically conductive material, spaced apart from one another in said measurement direction, which are connected electrically conductively to one another via an electrically conductive layer that forms said shunt, and said connecting element contacts said coating.

8. The linear encoder as defined by claim 7, wherein said scale comprises a transparent material on which said markings are applied.

9. The linear encoder as defined by claim 1, wherein said scale comprises a transparent material on which said measuring graduation is applied in the form of opaque markings.

10. A linear encoder comprising:
a scanning unit;
a housing comprising:
an elongated hollow profile section comprising a first face end and a second face end;
a cap disposed on said first face end; and
a seal which is disposed in sealing fashion between said hollow profile section and said cap, wherein said seal comprises an electrically conductive connecting element;
a scanning unit disposed inside said housing and which is movable in a measurement direction relative to said housing;
a scale made of electrically nonconductive material, wherein said scale is disposed inside said housing and said scale comprises a measuring graduation that is scannable by said scanning unit;
a shunt made of electrically conductive material, wherein said shunt is mounted on said scale and extends in said measurement direction; and
wherein said electrically conductive connecting element comprises an electrically conductive elastomer and said electrically conductive connecting element is configured so as to establish an electrical connection between said shunt and at least one of said hollow profile section and said cap.

11. The linear encoder as defined by claim 10, wherein said electrically conductive connecting element is integrally formed onto said seal, and wherein said electrically conductive connecting element and said seal together comprise an electrically conductive elastomer.

12. The linear encoder as defined by claim 11, wherein said seal is embodied in plate-like fashion and rests on a face end of the hollow profile section and furthermore has at least one protrusion, which forms said electrically conductive connecting element and resiliently contacts said shunt.

13. The linear encoder as defined by claim 11, wherein said shunt is an electrically conductive layer applied to said scale.

14. The linear encoder as defined by claim 10, wherein said seal is embodied in plate-like fashion and rests on a face end of the hollow profile section and furthermore has at least one protrusion, which forms said electrically conductive connecting element and resiliently contacts said shunt.

15. The linear encoder as defined by claim 10, wherein said shunt is an electrically conductive layer applied to said scale.

16. The linear encoder as defined by claim 10, wherein said measuring graduation comprises markings of electrically conductive material, spaced apart from one another in said measurement direction, which are connected electrically conductively to one another via an electrically conductive layer that forms said shunt, and said connecting element contacts said coating.

17. The linear encoder as defined by claim 16, wherein said scale comprises a transparent material on which said markings are applied.

18. The linear encoder as defined by claim 10, wherein said scale comprises a transparent material on which said measuring graduation is applied in the form of opaque markings.

19. The linear encoder as defined by claim 10, wherein the scanning unit is secured to an attachment which extends through said seal.

* * * * *